United States Patent
Nordbruch

(10) Patent No.: US 10,515,490 B2
(45) Date of Patent: Dec. 24, 2019

(54) METHOD AND DEVICE FOR DETERMINING WHETHER A MOTOR VEHICLE IS INSTANTANEOUSLY DRIVEN MANUALLY OR AUTOMATICALLY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/254,796

(22) Filed: Sep. 1, 2016

(65) Prior Publication Data

US 2017/0076513 A1   Mar. 16, 2017

(30) Foreign Application Priority Data

Sep. 10, 2015   (DE) .................. 10 2015 217 275

(51) Int. Cl.
*G07C 5/08* (2006.01)
*B60W 50/08* (2012.01)

(52) U.S. Cl.
CPC ............. *G07C 5/08* (2013.01); *B60W 50/082* (2013.01)

(58) Field of Classification Search
None
See application file for complete search history.

(56) References Cited

U.S. PATENT DOCUMENTS

| | | | | |
|---|---|---|---|---|
| 8,996,224 B1 * | 3/2015 | Herbach | ............ | G05D 1/0011 180/116 |
| 9,020,697 B2 * | 4/2015 | Ricci | .............. | H04W 4/21 701/36 |
| 9,082,239 B2 * | 7/2015 | Ricci | .............. | H04W 4/44 |
| 9,443,192 B1 * | 9/2016 | Cosic | ............ | G06N 3/02 |
| 9,511,723 B2 | 12/2016 | Eckert et al. | | |
| 9,557,736 B1 * | 1/2017 | Silver | ............ | G06K 9/00812 |
| 9,841,762 B2 * | 12/2017 | Moran | .......... | B60W 30/085 |
| 2013/0231824 A1 * | 9/2013 | Wilson | .......... | G05D 1/0246 701/26 |

(Continued)

FOREIGN PATENT DOCUMENTS

| | | |
|---|---|---|
| DE | 102011112578 A1 | 3/2013 |
| DE | 102012222562 | 6/2014 |
| DE | 102013222071 A1 | 4/2015 |

*Primary Examiner* — Jean Paul Cass
(74) *Attorney, Agent, or Firm* — Norton Rose Fulbright US LLP; Gerard Messina

(57) ABSTRACT

A method for determining whether a motor vehicle is instantaneously driven manually or automatically, the motor vehicle being operable in a first operating mode in which the motor vehicle may be driven manually, and operable in a second operating mode in which the motor vehicle may be driven automatically. The method includes checking whether minimum conditions are met. If the change instruction specifies that a change is to be made from the first into the second operating mode, determining that the motor vehicle is instantaneously driven automatically when all minimum conditions are met, and otherwise, determining that the motor vehicle is instantaneously driven manually. If the change instruction specifies that a change is to be made from the second into the first operating mode, determining that the motor vehicle is instantaneously driven manually when all minimum conditions are met, and otherwise, determining that the motor vehicle is instantaneously driven automatically.

17 Claims, 1 Drawing Sheet

(56) References Cited

U.S. PATENT DOCUMENTS

| | | | | |
|---|---|---|---|---|
| 2014/0303827 A1* | 10/2014 | Dolgov | ............... | B60W 30/00 |
| | | | | 701/23 |
| 2016/0347310 A1* | 12/2016 | Moran | ............... | B60W 30/09 |
| 2017/0132916 A1* | 5/2017 | Ioli | ............... | G08G 1/012 |
| 2017/0234689 A1* | 8/2017 | Gibson | ............... | G01C 21/3492 |
| | | | | 701/25 |
| 2017/0248949 A1* | 8/2017 | Moran | ............... | B60W 30/085 |
| 2017/0248950 A1* | 8/2017 | Moran | ............... | G08G 1/165 |

* cited by examiner

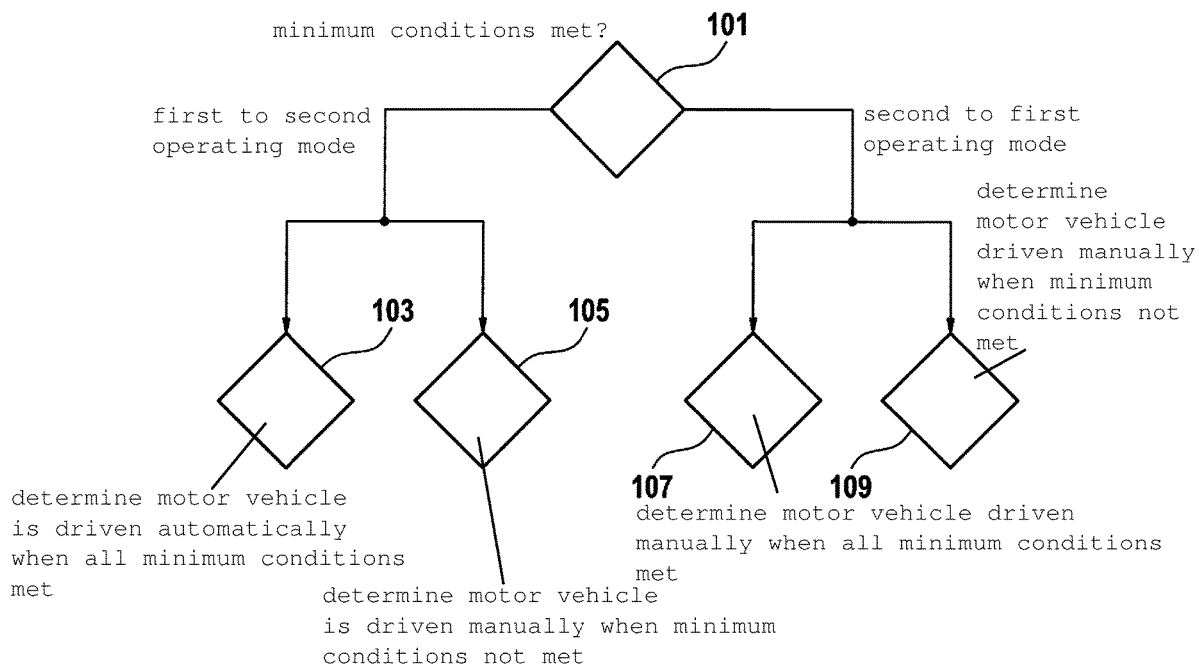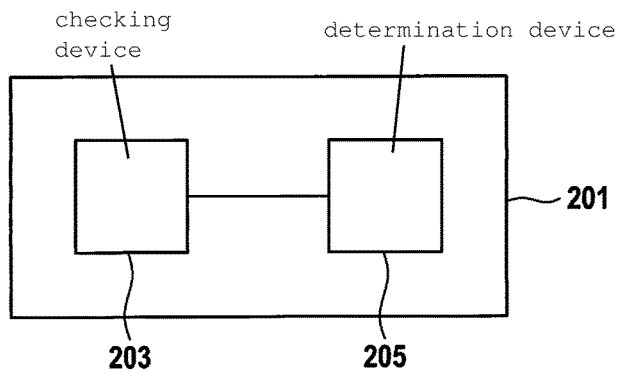

METHOD AND DEVICE FOR DETERMINING WHETHER A MOTOR VEHICLE IS INSTANTANEOUSLY DRIVEN MANUALLY OR AUTOMATICALLY

CROSS REFERENCE

The present application claims the benefit under 35 U.S.C. § 119 of German Patent Application No. DE 102015217275.9 filed on Sep. 10, 2015, which is expressly incorporated herein by reference in its entirety.

FIELD

The present invention relates to a method and a device for determining whether a motor vehicle is instantaneously driven manually or automatically. Moreover, the present invention relates to a computer program.

BACKGROUND INFORMATION

German Patent Application DE 10 2012 222 562 A1 describes a system for managed parking lots for transferring a vehicle from a starting position into a target position. Within the scope of the transfer, the vehicle is driven automatically. This means that during the transfer, the driver him/herself no longer has to be present in the vehicle to manually drive the vehicle.

Such vehicles, which may be automatically transferred from a starting position into a target position with the aid of such a system, are generally operable in a first operating mode in which the motor vehicle may be driven manually, and in a second operating mode in which the motor vehicle may be driven automatically. For automatically transferring the vehicle from a starting position into a target position, it is provided that a change is made from the first operating mode into the second operating mode. Conversely, it is provided that when the transfer has ended, a change is made from the second operating mode into the first operating mode so that a person may take over the vehicle at the target position and drive away manually.

Knowing whether a vehicle is instantaneously driven automatically or manually is relevant in particular for the system which is to automatically drive the vehicle. As long as the vehicle is still being driven manually, changing into the second operating mode is generally not desired. Conversely, a change should not be made into the first operating mode when a person who is to take over the vehicle is not yet ready for this takeover.

In addition, from legal as well as liability standpoints it is relevant to know whether a motor vehicle is instantaneously driven manually or automatically.

SUMMARY

An object of the present invention is to efficiently determine whether a motor vehicle is instantaneously driven manually or automatically.

According to one aspect of the present invention, a method is provided for determining whether a motor vehicle is instantaneously driven manually or automatically, the motor vehicle being operable in a first operating mode in which the motor vehicle may be driven manually, and operable in a second operating mode in which the motor vehicle may be driven automatically, the method including the following steps:

checking whether the following minimum conditions are met:
  an instantaneous position of the motor vehicle corresponds to a predefined setpoint position,
  a change instruction of a driver for changing the operating mode is detected,
  a change confirmation confirming the change instruction in a system for automatically driving the motor vehicle is detected,
if the change instruction specifies that a change is to be made from the first into the second operating mode, determining that the motor vehicle is instantaneously driven automatically when all minimum conditions are met, and otherwise, determining that the motor vehicle is instantaneously driven manually,
if the change instruction specifies that a change is to be made from the second into the first operating mode, determining that the motor vehicle is instantaneously driven manually when all minimum conditions are met, and otherwise, determining that the motor vehicle is instantaneously driven automatically.

According to another aspect, a device is provided for determining whether a motor vehicle is instantaneously driven manually or automatically, the motor vehicle being operable in a first operating mode in which the motor vehicle may be driven manually, and operable in a second operating mode in which the motor vehicle may be driven automatically, including:
  a checking device for checking whether the following minimum conditions are met:
    an instantaneous position of the motor vehicle corresponds to a predefined setpoint position,
    a change instruction of a driver for changing the operating mode is detected,
    a change confirmation of the change instruction in a system for automatically driving the motor vehicle is detected,
  a determination device which is designed for determining, in the event that the change instruction specifies that a change is to be made from the first into the second operating mode, that the motor vehicle is instantaneously driven automatically when all minimum conditions are met, and otherwise, determining that the motor vehicle is instantaneously driven manually,
  the determination device being designed for determining, in the event that the change instruction specifies that a change is to be made from the second into the first operating mode, that the motor vehicle is instantaneously driven manually when all minimum conditions are met, and otherwise, determining that the motor vehicle is instantaneously driven automatically.

According to another aspect, a computer program is provided which includes program code for carrying out the method according to the present invention when the computer program is executed on a computer.

The present invention thus includes in particular, and among other things, making the decision of whether a motor vehicle is instantaneously driven manually or automatically as a function of whether predefined minimum conditions are met. In this way it may be efficiently determined whether the motor vehicle is instantaneously driven manually or automatically, in particular by simple checking of the minimum conditions.

The determination of whether the motor vehicle is instantaneously driven manually or automatically is in particular independent of the actual operating mode in which the motor vehicle is instantaneously operated. Thus, even if the motor vehicle has already been changed from the first into the second operating mode, as long as the motor vehicle is not yet at the predefined setpoint position it is determined that the motor vehicle is instantaneously still driven manually.

Within the meaning of the present invention, the determination is thus a definition of whether the motor vehicle is instantaneously driven manually or automatically.

Thus, even though the motor vehicle has already changed from the second into the first operating mode and is already at its predefined setpoint position, as long as only the change instruction, but not the change confirmation, is present, it is determined or defined that the motor vehicle is still instantaneously driven automatically.

This definition is relevant in particular for legal as well as for liability reasons. As long as a motor vehicle is still being driven manually, the responsibility for the motor vehicle and for proper driving of the motor vehicle lies with the motor vehicle driver. However, as soon as a motor vehicle is driven automatically by the system, the responsibility transfers from the motor vehicle driver to the system. Within the scope of the present invention, the time of this transfer of the responsibility is defined or determined based on the predefined minimum conditions.

Thus, the motor vehicle driver should not hand off his/her responsibility merely by specifying a change instruction. Rather, the vehicle driver must also ensure that he/she has parked the motor vehicle at the predefined setpoint position. It is not until the change confirmation is also present that the motor vehicle driver knows that he/she no longer has responsibility for the motor vehicle, and the responsibility has been transferred to the system. It is now determined or defined, based on meeting the minimum conditions, that the motor vehicle is being driven automatically.

This similarly applies when the system transfers the responsibility back to the motor vehicle driver. Thus, it is not sufficient that the system has automatically parked the motor vehicle at the predefined setpoint position. Rather, a change input must be present, and in addition the change confirmation must be present, and only then is it defined that the responsibility has been transferred from the system to the motor vehicle driver, and it is now determined or defined, based on meeting the minimum conditions, that the motor vehicle is being driven manually.

This makes it easier for a motor vehicle driver to recognize when he/she has the responsibility for the motor vehicle, and whether or not, and when, this responsibility has been transferred.

According to one specific embodiment, it is provided that, if the change instruction specifies that a change is to be made from the first into the second operating mode, and if it is determined that the motor vehicle is instantaneously driven automatically, a change is made from the first into the second operating mode. This means that a change is made from the first into the second operating mode only when responsibility has been defined as transferred from the driver to the system. This means that the driver still has responsibility for his/her motor vehicle as long as all minimum conditions have not been met. This means that, even after the driver has sent his/her change instruction, it continues to be determined or defined that the motor vehicle is still being driven manually with the aid of the driver until the other minimum conditions are likewise met. Thus, the driver is not yet relieved of the responsibility for driving the motor vehicle when he/she sends the change instruction.

In another specific embodiment, it is provided that, if the change instruction specifies that a change is to be made from the second into the first operating mode, and if it is determined that the motor vehicle is instantaneously driven manually, a change is made from the second into the first operating mode. This means that the system for automatically driving the motor vehicle is not relieved of its responsibility for driving the motor vehicle until all minimum conditions are present. Solely the intent of a driver to change from the second into the first operating mode (change instruction) is not sufficient for the responsibility to be defined as transferred.

A manually driven motor vehicle thus refers in particular to a motor vehicle that is still being driven, at least indirectly, in particular directly, by the motor vehicle driver (driver).

An automatically driven motor vehicle thus refers in particular to a motor vehicle that is no longer driven with the aid of a human motor vehicle driver, but instead is driven with the aid of the system for automatically driving the motor vehicle.

In the second operating mode, the motor vehicle is drivable by remote control, for example. In the second operating mode, the motor vehicle may travel autonomously, for example. This means that when the motor vehicle is in the second operating mode, it may be remote-controlled or that the motor vehicle may travel autonomously.

Specifying the minimum conditions makes a clear, efficient definition possible in order to decide whether the motor vehicle is instantaneously driven manually or automatically.

It may thus advantageously be determined whether responsibility for the motor vehicle has been transferred from the driver of the motor vehicle to the system for automatically driving the motor vehicle. In particular, it may thus advantageously be established whether responsibility for the motor vehicle has been transferred from the system for automatically driving the motor vehicle to the driver of the motor vehicle.

As long as all minimum conditions are not met, such a transfer of responsibility cannot be completed. Thus, as long as it is determined or defined that the motor vehicle is still being driven manually, the responsibility for the motor vehicle continues to lie with the driver. However, as soon as it is determined or defined that the motor vehicle is being driven automatically, the responsibility no longer lies with the driver, but, rather, lies with the system for automatically driving the motor vehicle.

In one specific embodiment, it is provided that for the case that a change is to be made from the first into the second operating mode, a drop-off position in a parking facility from which the motor vehicle is to carry out an automatic parking operation is specified as the setpoint position.

This results in particular in the technical advantage that a transfer of responsibility from the driver to the system within the scope of an automatic parking operation may be efficiently determined.

In another specific embodiment, it is provided that for the case that a change is to be made from the second into the first operating mode, a pick-up position in a parking facility at which the motor vehicle is to be parked after an automatic parking operation has ended is specified as the setpoint position.

This results in particular in the technical advantage that a transfer of responsibility from the system to the driver within the scope of an automatic parking operation may be efficiently determined.

An automatic parking operation may also be referred to as an automated valet parking (AVP) operation.

Within the scope of an AVP operation, the motor vehicle is automatically parked at a parking position within the parking facility, and is driven automatically from the parking position to a position inside or outside the parking facility at which a person may once again pick up the motor vehicle. Within the scope of the automatic parking operation, it is thus provided that a driver him/herself no longer has to be present in the motor vehicle. Within the scope of an automatic parking operation, the motor vehicle travels autonomously or by remote control.

Within the meaning of the present invention, a parking facility forms a parking area for motor vehicles. The parking facility thus forms in particular a contiguous area which is formed from multiple parking spaces for a parking facility on private property, or multiple parking positions for a parking facility on public property. The parking spaces on private property or parking positions on public property are thus parking positions in the parking facility on which motor vehicles may park.

According to one specific embodiment, the parking facility is designed as a parking deck.

In another specific embodiment, the parking facility is designed as a parking garage.

Within the scope of the AVP operation, according to one specific embodiment it is provided that the motor vehicle is driven automatically from the drop-off position to a parking position.

Within the scope of an AVP operation, according to one specific embodiment it is provided that the motor vehicle is driven automatically from a parking position to the pick-up position.

According to another specific embodiment, it is provided that the checking of whether a change instruction of a driver for changing the operating mode has been detected includes checking whether a change instruction has been received by the system for automatically driving the motor vehicle via a communication network, and if this is the case, it is determined that the change instruction has been detected.

This results in particular in the technical advantage that it may be efficiently determined whether this one minimum condition is present. For example, it is provided that a driver (motor vehicle driver) of the motor vehicle sends his/her change instruction to the system for automatically driving the motor vehicle via a communication network with the aid of his/her mobile terminal, for example with the aid of his/her mobile telephone. Thus, only after this change instruction has been received by the system is it determined that the change instruction has been detected.

In another specific embodiment, it is provided that the checking of whether a change instruction of a driver for changing the operating mode has been detected includes checking whether a change instruction with the aid of a terminal of a parking facility has been detected, and if this is the case, it is determined that the change instruction has been detected.

This results in particular in the technical advantage that it may be efficiently determined whether this one minimum condition is present. For example, according to one specific embodiment it is provided that a terminal is provided in the parking facility. Such a terminal is used, for example, as a human-machine interface for the driver of the motor vehicle so that the driver may enter his/her change instruction at the terminal. According to one specific embodiment, for example, the terminal transmits the entered or detected change instruction to the system. Thus, if it is then detected that the change instruction has been detected with the aid of the terminal, it is determined that the change instruction has been detected, i.e., that this one minimum condition has been met.

According to another specific embodiment, it is provided that the minimum conditions also include the following minimum condition: the motor vehicle is safely parked.

This results in particular in the technical advantage that it is ensured that the motor vehicle does not represent a hazard for other motorists. A safely parked motor vehicle generally represents less of a hazard to its surroundings than an unsafely parked motor vehicle.

According to one specific embodiment, it is provided that the checking of whether the minimum condition that the motor vehicle is safely parked includes checking whether a parking brake of the motor vehicle is set and/or whether a manually shiftable motor vehicle is in gear and/or whether an automatically shiftable motor vehicle is engaged in a parking gear, and if this is the case, it is determined that the motor vehicle is safely parked.

This results in particular in the technical advantage that it may be efficiently established whether the motor vehicle is safely parked. If the parking brake of the motor vehicle is set, it is assumed that the motor vehicle is safely parked. If a manually shiftable motor vehicle is in gear and/or an automatically shiftable motor vehicle is engaged in a parking gear, it is assumed that the motor vehicle is safely parked. If it has been established that the parking brake is set and also that a manually shiftable motor vehicle is in gear and/or an automatically shiftable motor vehicle is engaged in a parking gear, it is decided or defined that the motor vehicle is safely parked.

In another specific embodiment, it is provided that the minimum conditions also include one or more of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

This results in particular in the technical advantage that, due to the presence of further minimum conditions, the determination of whether the motor vehicle is being driven manually or automatically may be efficiently carried out. If, for example, a person is still inside the motor vehicle, it may be assumed that this person is also manually driving the motor vehicle. Therefore, the motor vehicle cannot be in the second operating mode. However, if a person is no longer inside the motor vehicle, it may generally be assumed that the motor vehicle is no longer being driven manually, but instead is being driven automatically.

In particular, when the minimum condition is present that there are no persons in the surroundings of the motor vehicle up to a predetermined minimum distance relative to the motor vehicle, it may be efficiently ensured that no person situated outside the predetermined minimum distance can be endangered when the motor vehicle changes into the second operating mode.

According to one specific embodiment, it is provided that the device for determining whether a motor vehicle is instantaneously driven manually or automatically is designed or configured for executing or carrying out the method for determining whether a motor vehicle is instantaneously driven manually or automatically.

According to one specific embodiment, it is provided that the method for determining whether a motor vehicle is instantaneously driven manually or automatically is executed or carried out with the aid of the device for determining whether a motor vehicle is instantaneously driven manually or automatically.

Technical functionalities of the device similarly result from corresponding technical functionalities of the method, and vice versa.

According to one specific embodiment, it is provided that the checking device is designed for specifying a drop-off position in a parking facility, from which the motor vehicle is to carry out an automatic parking operation, as the setpoint position, so that for the case that a change is to be made from the first into the second operating mode, the checking device may specify the drop-off position as the setpoint position.

According to another specific embodiment, it is provided that the checking device is designed for specifying a pick-up position in a parking facility, at which the motor vehicle is to be parked after an automatic parking operation has ended, as the setpoint position, so that for the case that a change is to be made from the second into the first operating mode, the checking device may specify the pick-up position as the setpoint position.

According to another specific embodiment, it is provided that the checking device is designed for checking whether a change instruction has been received by the system for automatically driving the motor vehicle via a communication network.

In another specific embodiment, it is provided that the checking device is designed for checking whether a change instruction with the aid of a terminal of a parking facility has been detected.

According to yet another specific embodiment, it is provided that the minimum conditions also include the following minimum condition: the motor vehicle is safely parked.

According to yet another specific embodiment, it is provided that the checking device is designed for checking whether the motor vehicle is safely parked, whether a parking brake of the motor vehicle is set, and/or whether a manually shiftable motor vehicle is in gear and/or whether an automatically shiftable motor vehicle is engaged in a parking gear.

In yet another specific embodiment, it is provided that the minimum conditions also include one or several of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

In one specific embodiment, the system is a system within the motor vehicle for automatically driving the motor vehicle.

In another specific embodiment, the system is a system outside the motor vehicle for automatically driving the motor vehicle.

In another specific embodiment, the system includes a system within the motor vehicle for automatically driving the motor vehicle as well as a system outside the motor vehicle for automatically driving the motor vehicle.

The present invention is explained in greater detail below with reference to preferred exemplary embodiments.

BRIEF DESCRIPTION OF THE DRAWINGS

FIG. 1 shows a flow chart of a method for determining whether a motor vehicle is instantaneously driven manually or automatically.

FIG. 2 shows a device for determining whether a motor vehicle is instantaneously driven manually or automatically.

DETAILED DESCRIPTION OF EXAMPLE EMBODIMENTS

FIG. 1 shows a flow chart of a method for determining whether a motor vehicle is instantaneously driven manually or automatically, the motor vehicle being operable in a first operating mode in which the motor vehicle may be driven manually, and operable in a second operating mode in which the motor vehicle may be driven automatically.

The method includes the following steps:
checking 101 whether the following minimum conditions are met:
  an instantaneous position of the motor vehicle corresponds to a predefined setpoint position,
  a change instruction of a driver for changing the operating mode is detected,
a change confirmation confirming the change instruction in a system for automatically driving the motor vehicle is detected,
if the change instruction specifies that a change is to be made from the first into the second operating mode, determining 103 that the motor vehicle is instantaneously driven automatically when all minimum conditions are met, and otherwise, determining 105 that the motor vehicle is instantaneously driven manually,
if the change instruction specifies that a change is to be made from the second into the first operating mode, determining 107 that the motor vehicle is instantaneously driven manually when all minimum conditions are met, and otherwise, determining 109 that the motor vehicle is instantaneously driven automatically.

According to one specific embodiment, it is provided that the minimum conditions also include one or several of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

According to one specific embodiment, the determination of whether there are no persons in the surroundings of the motor vehicle up to a predetermined minimum distance is carried out with the aid of a surroundings sensor system. The surroundings sensor system includes one or multiple surroundings sensors, for example. A surroundings sensor is one of the following surroundings sensors, for example: radar sensor, ultrasonic sensor, LIDAR sensor, magnetic sensor, video sensor, or laser sensor.

The surroundings sensor system is, for example, a surroundings sensor system of the motor vehicle. The surroundings sensor system is, for example, a surroundings sensor system of the parking facility. According to one specific embodiment, the checking of whether there are no persons in the surroundings of the motor vehicle up to a predetermined minimum distance is carried out with the aid of the surroundings sensor system of the motor vehicle and with the aid of the surroundings sensor system of the parking facility.

The predetermined minimum distance is for example 20 meters, for example 10 meters, in particular 5 meters, preferably 3 meters.

According to one specific embodiment, it is provided that if the change instruction specifies that a change is to be made from the first into the second operating mode, and if it is determined that the motor vehicle is instantaneously driven automatically, a change is made from the first into the second operating mode. This means that a change is made from the first into the second operating mode only when responsibility is defined as transferred from the driver to the system. This means that the driver still has responsibility for his/her motor vehicle as long as all minimum conditions have not been met. This means that even after the driver has sent his/her change instruction, the motor vehicle continues to be driven manually with the aid of the driver until the other minimum conditions are likewise met. Thus, the driver is not yet relieved of the responsibility for driving the motor vehicle when he/she sends the change instruction.

In another specific embodiment, it is provided that if the change instruction specifies that a change is to be made from the second into the first operating mode, and if it is determined that the motor vehicle is instantaneously driven manually, a change is made from the second into the first operating mode. This means that the system for automatically driving the motor vehicle is not relieved of its responsibility for driving the motor vehicle until all minimum conditions are present. Solely the intent of a driver to change from the second into the first operating mode (change instruction) is not sufficient for the responsibility to be defined as transferred.

A manually driven motor vehicle thus refers in particular to a motor vehicle which is still being driven, at least indirectly, by the vehicle driver.

An automatically driven motor vehicle thus refers in particular to a motor vehicle which is no longer driven with the aid of a human motor vehicle driver, but, rather, is driven with the aid of the system for automatically driving the motor vehicle.

FIG. 2 shows a device 201 for determining whether a motor vehicle is instantaneously driven manually or automatically, the motor vehicle being operable in a first operating mode in which the motor vehicle may be driven manually, and operable in a second operating mode in which the motor vehicle may be driven automatically.

Device 201 includes:
  a checking device 203 for checking whether the following minimum conditions are met:
    an instantaneous position of the motor vehicle corresponds to a predefined setpoint position,
    a change instruction of a driver for changing the operating mode is detected,
    a change confirmation of the change instruction in a system for automatically driving the motor vehicle is detected,
  a determination device 205 which is designed for determining, in the event that the change instruction specifies that a change is to be made from the first into the second operating mode, that the motor vehicle is instantaneously driven automatically when all minimum conditions are met, and otherwise, determining that the motor vehicle is instantaneously driven manually,
  the determination device 205 being designed for determining, in the event that the change instruction specifies that a change is to be made from the second into the first operating mode, that the motor vehicle is instantaneously driven manually when all minimum conditions are met, and otherwise, determining that the motor vehicle is instantaneously driven automatically.

The present invention thus includes in particular, and among other things, the idea of providing an efficient technical concept which allows a transfer of responsibility from the driver to the system to be defined and efficiently determined. This means that the transfer of responsibility may be traced. It is provided in particular that the driver of the motor vehicle and the system for automatically driving the motor vehicle must both confirm that the motor vehicle is to be driven in the second operating mode. When it is additionally established that the instantaneous position of the motor vehicle corresponds to a predefined setpoint position, it is defined, i.e., determined, that the motor vehicle is driven automatically, not manually.

In another specific embodiment, this active confirmation is carried out with the aid of a mobile telephone.

In another specific embodiment, the active confirmation is carried out via a terminal of the parking facility.

In another specific embodiment, additional further minimum conditions (criteria) are checked. These are used, for example, as the basis for the confirmation of the system for automatically driving the motor vehicle.

In another specific embodiment, the motor vehicle must be safely parked. This means that it must be in gear (in parking gear for an automatic transmission), and/or the parking brake must be set.

In another specific embodiment, the minimum conditions include that the drive engine of the motor vehicle is switched off.

In another specific embodiment, the minimum conditions include that all electrical consumers of the motor vehicle are switched off.

In another specific embodiment, the minimum conditions include that the driver and possible occupants are no longer present in the motor vehicle.

In another specific embodiment, the minimum conditions include that the driver and the occupants are situated at a predefined minimum distance from the motor vehicle.

In another specific embodiment, the minimum conditions include that all windows, all doors, and the trunk of the motor vehicle are closed.

In another specific embodiment, the minimum conditions include that the motor vehicle is closed up, i.e., locked.

In another specific embodiment, the minimum conditions include that when damage to the motor vehicle is detected, this damage is communicated (a notification of whether the motor vehicle has damage is present). For example, when the motor vehicle is dropped off at the drop-off position for the automatic parking operation, for example pre-existing damage to the motor vehicle is detected and appropriately documented and communicated. For example, when the motor vehicle is picked up at the pick-up position, for example, damage which has occurred within the scope of the AVP operation may be detected, documented, and communicated.

In one specific embodiment, the transfer of responsibility is documented. This means that according to one specific embodiment, one of the method steps, all method steps, or some of the method steps is/are documented.

The above-mentioned steps similarly apply for the transfer of responsibility from the system for automatically driving the motor vehicle back to the driver upon pick-up after the AVP operation. The predefined setpoint position is then the pick-up position.

According to one specific embodiment, the pick-up position is identical to the drop-off position. In another specific embodiment, these two positions are different.

What is claimed is:

1. A method for determining whether a motor vehicle is instantaneously driven manually or automatically, the motor vehicle being operable in a first operating mode in which the motor vehicle may be driven manually, and operable in a second operating mode in which the motor vehicle may be driven automatically, the method comprising:
   checking whether the following minimum conditions are met: an instantaneous position of the motor vehicle corresponds to a predefined setpoint position, a change instruction of a driver for changing the operating mode is detected, and a change confirmation confirming the change instruction in a system for automatically driving the motor vehicle is detected;
   if the change instruction specifies that a change is to be made from the first into the second operating mode, determining that the motor vehicle is instantaneously driven automatically when all of the minimum conditions are met, and otherwise, determining that the motor vehicle is instantaneously driven manually; and
   if the change instruction specifies that a change is to be made from the second into the first operating mode, determining that the motor vehicle is instantaneously driven manually when all of the minimum conditions are met, and otherwise, determining that the motor vehicle is instantaneously driven automatically,
   wherein the determination of whether the motor vehicle is instantaneously driven manually or automatically is in independent of an actual operating mode in which the motor vehicle is instantaneously operated,
   wherein the driver is not inside the motor vehicle at the time of the change instruction or the change from the one mode to the another mode,
   wherein, if the change instruction but not the change confirmation is detected, it is determined that the motor vehicle is still instantaneously driven automatically,
   wherein for the case that a change is to be made from the first into the second operating mode, a drop-off position in a parking facility from which the motor vehicle is to carry out an automatic parking operation is specified as the setpoint position,
   wherein the minimum conditions also include at least one of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

2. The method as recited in claim 1, wherein for the case that a change is to be made from the second into the first operating mode, a pick-up position in a parking facility at which the motor vehicle is to be parked after an automatic parking operation has ended is specified as the setpoint position.

3. The method as recited in claim 1, wherein the checking of whether a change instruction of a driver for changing the operating mode has been detected includes checking whether a change instruction has been received by the system for automatically driving the motor vehicle via a communication network, and if this is the case, determining that the change instruction has been detected.

4. The method as recited in claim 1, wherein the checking of whether a change instruction of a driver for changing the operating mode has been detected includes checking whether a change instruction has been detected with the aid of a terminal of a parking facility, and if this is the case, determining that the change instruction has been detected.

5. The method as recited claim 1, wherein the minimum conditions also include the following minimum condition: the motor vehicle is safely parked.

6. The method as recited in claim 5, wherein the checking of whether the minimum condition that the motor vehicle is safely parked includes checking at least one of: whether a parking brake of the motor vehicle is set, whether a manually shiftable motor vehicle is in gear, and whether an automatically shiftable motor vehicle is engaged in a parking gear, and if this is the case, determining that the motor vehicle is safely parked.

7. A method for determining whether a motor vehicle is instantaneously driven manually or automatically, the motor vehicle being operable in a first operating mode in which the motor vehicle may be driven manually, and operable in a second operating mode in which the motor vehicle may be driven automatically, the method comprising:
   checking whether the following minimum conditions are met: an instantaneous position of the motor vehicle corresponds to a predefined setpoint position, a change instruction of a driver for changing the operating mode is detected, and a change confirmation confirming the change instruction in a system for automatically driving the motor vehicle is detected;
   if the change instruction specifies that a change is to be made from the first into the second operating mode, determining that the motor vehicle is instantaneously driven automatically when all of the minimum conditions are met, and otherwise, determining that the motor vehicle is instantaneously driven manually; and
   if the change instruction specifies that a change is to be made from the second into the first operating mode, determining that the motor vehicle is instantaneously driven manually when all of the minimum conditions are met, and otherwise, determining that the motor vehicle is instantaneously driven automatically,
   wherein the determination of whether the motor vehicle is instantaneously driven manually or automatically is in independent of an actual operating mode in which the motor vehicle is instantaneously operated,
   wherein the driver is not inside the motor vehicle at the time of the change instruction or the change from the one mode to the another mode,
   wherein, if the change instruction but not the change confirmation is detected, it is determined that the motor vehicle is still instantaneously driven automatically,
   wherein the checking of whether a change instruction of a driver for changing the operating mode has been detected includes checking whether a change instruction has been detected with the aid of a terminal of a parking facility, and if this is the case, determining that the change instruction has been detected,
   wherein the minimum conditions also include at least one of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

8. The method as recited in claim 7, wherein for the case that a change is to be made from the first into the second operating mode, a drop-off position in a parking facility from which the motor vehicle is to carry out an automatic parking operation is specified as the setpoint position.

9. A device for determining whether a motor vehicle is instantaneously driven manually or automatically, the motor vehicle being operable in a first operating mode in which the motor vehicle may be driven manually, and operable in a second operating mode in which the motor vehicle may be driven automatically, the device comprising:
  a checking device configured to check whether the following minimum conditions are met: an instantaneous position of the motor vehicle corresponds to a predefined setpoint position, a change instruction of a driver for changing the operating mode is detected, and a change confirmation of the change instruction in a system for automatically driving the motor vehicle is detected; and
  a determination device which is configured to determine, in the event that the change instruction specifies that a change is to be made from the first into the second operating mode, that the motor vehicle is instantaneously driven automatically when all of the minimum conditions are met, and otherwise, determine that the motor vehicle is instantaneously driven manually, and the determination device being designed to determine, in the event that the change instruction specifies that a change is to be made from the second into the first operating mode, that the motor vehicle is instantaneously driven manually when all of the minimum conditions are met, and otherwise, determine that the motor vehicle is instantaneously driven automatically,
  wherein the determination of whether the motor vehicle is instantaneously driven manually or automatically is in independent of an actual operating mode in which the motor vehicle is instantaneously operated,
  wherein the driver is not inside the motor vehicle at the time of the change instruction or the change from the one mode to the another mode,
  wherein, if the change instruction but not the change confirmation is detected, it is determined that the motor vehicle is still instantaneously driven automatically,
  wherein the checking of whether a change instruction of a driver for changing the operating mode has been detected includes checking whether a change instruction has been detected with the aid of a terminal of a parking facility, and if this is the case, determining that the change instruction has been detected,
  wherein the minimum conditions also include at least one of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

10. The device as recited in claim 9, wherein the checking device is designed to specify a drop-off position in a parking facility, from which the motor vehicle is to carry out an automatic parking operation, as the setpoint position, so that for the case that a change is to be made from the first into the second operating mode, the checking device may specify the drop-off position as the setpoint position.

11. The device as recited in claim 9, wherein the checking device is designed for specifying a pick-up position in a parking facility, at which the motor vehicle is to be parked after an automatic parking operation has ended, as the setpoint position, so that for the case that a change is to be made from the second into the first operating mode, the checking device may specify the pick-up position as the setpoint position.

12. The device as recited in claim 9, wherein the checking device is designed to check whether a change instruction has been received by the system for automatically driving the motor vehicle via a communication network.

13. The device as recited in claim 9, wherein the checking device is designed to check whether a change instruction has been detected with the aid of a terminal of a parking facility.

14. The device as recited in claim 9, wherein the minimum conditions also include the following minimum condition: the motor vehicle is safely parked.

15. The device as recited in claim 14, wherein the checking device is designed to check at least one of: whether the motor vehicle is safely parked, whether a parking brake of the motor vehicle is set, whether a manually shiftable motor vehicle is in gear, and whether an automatically shiftable motor vehicle is engaged in a parking gear.

16. The device as recited in claim 9, wherein the minimum conditions also include at least one of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

17. A non-transitory computer-readable storage device storing a computer program which includes program code for determining whether a motor vehicle is instantaneously driven manually or automatically, the motor vehicle being operable in a first operating mode in which the motor vehicle may be driven manually, and operable in a second operating mode in which the motor vehicle may be driven automatically, the program code, when executed by a computer, causing the computer to perform:
  checking whether the following minimum conditions are met: an instantaneous position of the motor vehicle corresponds to a predefined setpoint position, a change instruction of a driver for changing the operating mode is detected, and a change confirmation confirming the change instruction in a system for automatically driving the motor vehicle is detected;
  if the change instruction specifies that a change is to be made from the first into the second operating mode, determining that the motor vehicle is instantaneously driven automatically when all of the minimum conditions are met, and otherwise, determining that the motor vehicle is instantaneously driven manually; and
  if the change instruction specifies that a change is to be made from the second into the first operating mode, determining that the motor vehicle is instantaneously driven manually when all of the minimum conditions are met, and otherwise, determining that the motor vehicle is instantaneously driven automatically,
  wherein the determination of whether the motor vehicle is instantaneously driven manually or automatically is in independent of an actual operating mode in which the motor vehicle is instantaneously operated,
  wherein the driver is not inside the motor vehicle at the time of the change instruction or the change from the one mode to the another mode, wherein, if the change instruction but not the change confirmation is detected, it is determined that the motor vehicle is still instantaneously driven automatically, wherein for the case that a change is to be made from the first into the second operating mode, a drop-off position in a parking facility from which the motor vehicle is to carry out an automatic parking operation is specified as the setpoint position, wherein the minimum conditions also include at least one of the following minimum conditions: a drive engine of the motor vehicle is switched off, all electrical consumers of the motor vehicle are switched off, there are no persons inside the motor vehicle, there are no persons in the surroundings of the motor vehicle up to a predetermined minimum distance, the motor vehicle is locked, all windows and doors of the motor vehicle are closed, and a notification is present as to whether the motor vehicle has damage.

* * * * *